United States Patent [19]

Blazevic

[11] Patent Number: 4,796,450
[45] Date of Patent: Jan. 10, 1989

[54] APPARATUS FOR IMPROVING HOT STRIP MILL PROCESSING

[76] Inventor: David T. Blazevic, 201 Lake Dr. - Unit 1A, Olympia Fields, Ill. 60461

[21] Appl. No.: 910,503

[22] Filed: Sep. 22, 1986

[51] Int. Cl.⁴ .................. B21B 45/08; B21B 27/10; B21B 39/16
[52] U.S. Cl. .......................... 72/39; 72/201; 72/236; 72/251
[58] Field of Search ............... 29/81 B; 72/38, 39, 72/40, 201, 236, 250, 251, 252, 428

[56] References Cited

U.S. PATENT DOCUMENTS

| | | | |
|---|---|---|---|
| 1,560,749 | 11/1925 | Witherow | 72/39 |
| 1,973,458 | 9/1934 | Yoder | 72/428 X |
| 2,163,699 | 6/1939 | Paul | 72/40 |
| 3,913,369 | 10/1975 | Field et al. | 72/251 |
| 4,233,830 | 11/1980 | Houdion | 72/39 X |

FOREIGN PATENT DOCUMENTS

| | | | |
|---|---|---|---|
| 53-82644 | 7/1978 | Japan | 72/39 |
| 57-14414 | 1/1982 | Japan | 72/39 |
| 59-104212 | 6/1984 | Japan | 72/39 |
| 59-200774 | 11/1984 | Japan | 72/39 |

Primary Examiner—E. Michael Combs
Attorney, Agent, or Firm—Leydig, Voit & Mayer

[57] ABSTRACT

A system for processing steel strips in a hot strip mill includes an apparatus and method for removing the oxide layer in the finishing mill process such that the final thickness of the oxide layer is much less than previously possible. In order to reduce the thickness of the oxide layer, the invention provides for the removal of oxide scales from the surface of the steel strips at a distance in front of the working rolls of the finishing mill that minimizes the time the strip is exposed to ambient conditions after it is descaled and before it is received between the pair of working rolls. By minimizing this exposure time, the thickness of the oxide layers in the finished strips is substantially reduced.

27 Claims, 4 Drawing Sheets

APPARATUS FOR IMPROVING HOT STRIP MILL PROCESSING

DESCRIPTION OF THE INVENTION

This invention generally relates to hot strip mill processing of elongated steel strips and, more particularly, to an improved apparatus and method for guiding and cleaning the elongated strips prior to the entering of the strips to the finishing mill operation.

In a hot strip mill, relatively wide steel slabs are rolled into very thin strips. Typically, a hot strip mill operation consists of three stages: a roughing stage, a finishing stage and a coiling stage. In the roughing stage, the thickness of the slab is reduced from a typical dimension of 8–10 inches to 1¼ inches. The finishing mill receives the steel strips after they have been reduced in thickness by the roughing mill, and the finishing mill further reduces the thickness of the strips to approximately 0.060 inch to 0.500 inch thick. Typically, a finishing mill consists of approximately four to seven closely spaced rolling mills. From the finishing mill, the strips are coiled for convenience of handling and further processing of the steel strip.

In existing mills, the finishing process operates satisfactorily only under normal conditions. When faced with an abnormal condition, such as a cambered strip, the finishing mill may jam because of cobbling of the strip or the cambered strip may be slowed by frictional engagement with centering guides, thereby slowing the speed of the strip. Slowing of the strips may cause serious damage to the finishing mill since unacceptable cooling may occur prior to entry of the strips between a pair of work rolls. Too much cooling makes the strips too hard for the working rolls to compress and, as a result, the mill may (1) suffer a power overload, (2) create non-uniform thickness along the lengths of the strip, or (3) actually break the work rolls.

Much of the cooling of the strips prior to their entry between the pair of work rolls is a result of the effect of high pressure liquid (typically water) sprayed onto the strips in order to remove any buildup of oxides on the surface of the strips prior to their entry into the working rolls. This removal of the oxide layer is commonly referred to as "descaling".

Because ambient conditions of the strips expose them to air, ferrous oxide layers are constantly forming on the surface of the strips. Therefore, after descaling, but before entry of the strips into the working rolls, a ferrous oxide layer inevitably forms. Typically, a pickling process employing acid is used to remove the oxide layers from the finished strips. Presently, the thickness of the oxide layers during the process is determined by the restrictions and placement of the descaling mechanism. Reduction of the oxide layers formed during the finishing process would result in savings in the pickle acid process. Moreover, replacement of the present descaling mechanism may reduce formation of oxides of relatively greater hardness (e.g., 1030 Vickers hardness for $Fe_2O_3$) By limiting the oxide formation to softer oxides, the wear of the working rolls could be dramatically decreased, thereby lengthening the time period between shutdowns of the mill for replacing worn rolls.

In view of the foregoing, it is a general object of the invention to provide an improved apparatus and method for guiding the steel strips as they enter the finishing mill such that the descaling process can be located at a minimum distance from the working rolls in order to minimize the amount of ferrous oxide buildup. In this connection, it is also an object of the invention to provide an apparatus for reducing the travel time of the steel strips between the area of descaling and the work rolls.

It is a further object of the invention to reduce the amount of acid necessary to remove oxide layers from finished steel strips and to reduce the maintenance required for the work rolls of the finishing mill.

It is a more particular object of the invention to stabilize the velocity and temperature of the strip as it enters the finishing mill to thereby improve the operation and reduce the iron oxide thickness.

Other objects and advantages of the invention will become apparent from reading the following detailed description and upon reference to the drawings, in which:

While the invention will be described in connection with preferred embodiment, it will be understood that the following description is not intended to limit the invention to a particular embodiment. On the contrary, it is applicant's intention to cover all alternatives and equivalents as may be included within the spirit and scope of the invention.

Figure 1:
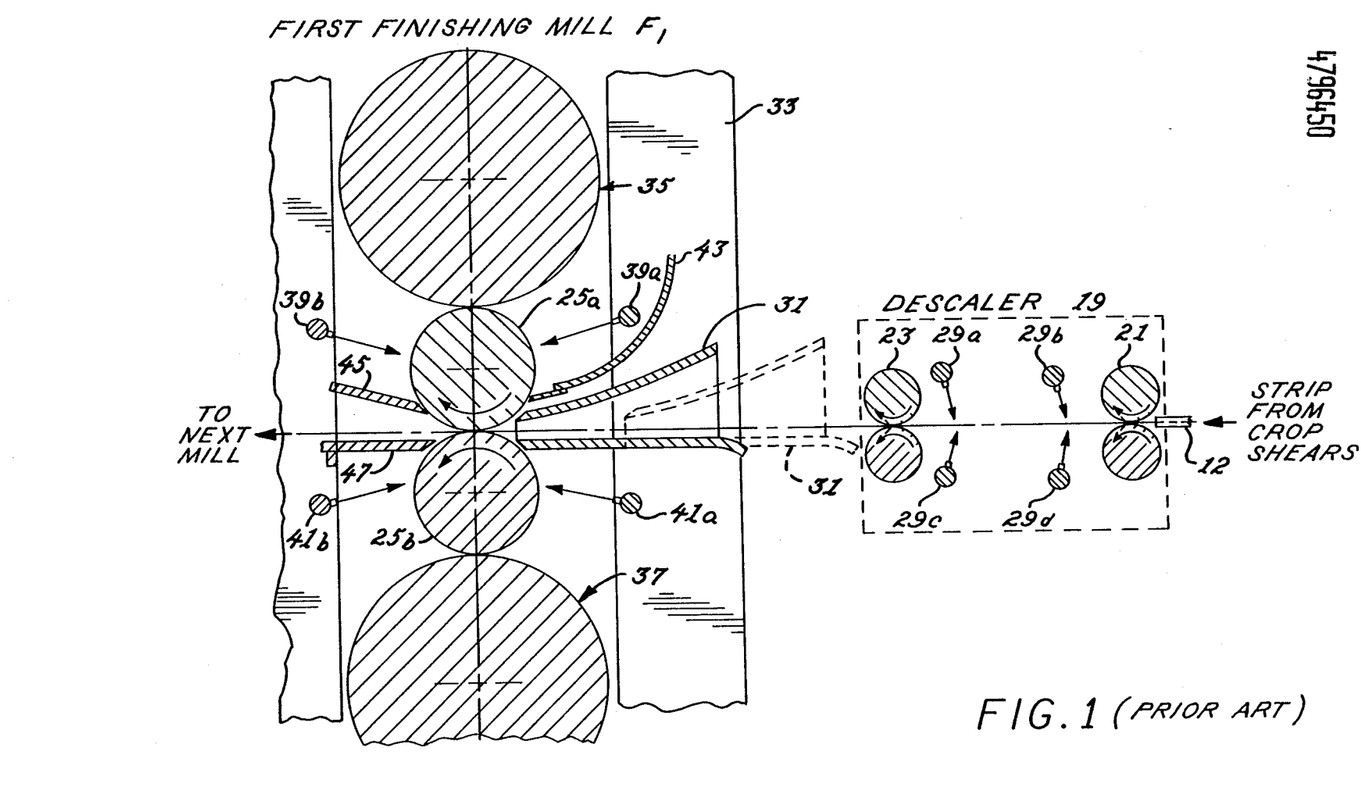
FIG. 1 is a schematic side view of a prior art finishing mill including a descaler and a strip guide.
Figure 2:
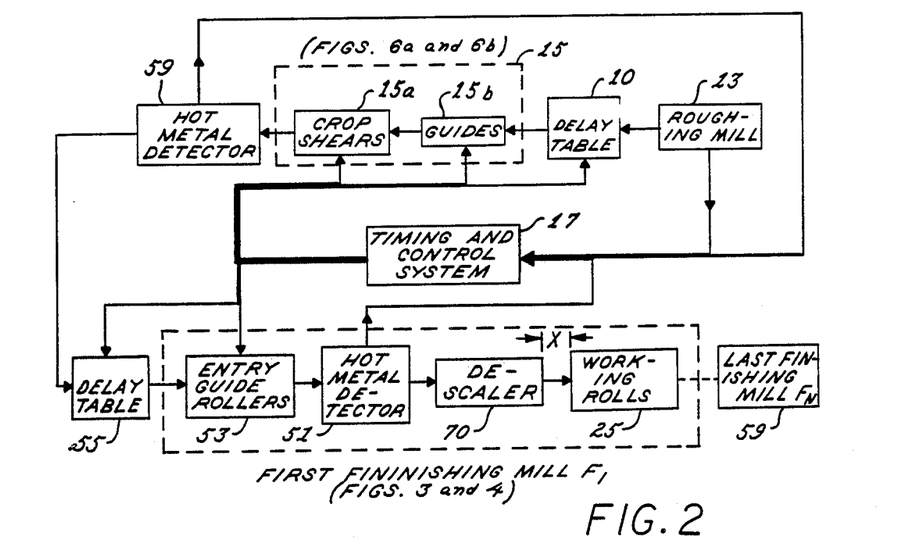
FIG. 2 is a block diagram of a finishing mill according to the invention, illustrating the various input and output signals required for guidance of the steel strips in accordance with the invention.

Referring generally to FIGS. 1 and 2 of the drawings, in the finishing stage process of hot strip mills, a series of aligned delay tables 10 receive an elongated steel strip 12 as it exits from the last roughing mill 13. Following the entry of the strip 12 onto the delay table 10, the head end of the strip is aligned and cut by a crop shear and guide assembly 15. The crop shear and guide assembly 15 is comprised of crop shears 15a and centering guides 15b.

Typically, a timing and control system 17 is provided which receives control signals that automatically correlate the rotation of the crop shears 15a with the position of each strip 12 such that the head and tail ends are properly cut. The crop shears 15a comprise a pair of opposing rollers (shown in FIG. 6b), each having a shear knife attached along the length of the perimeter of the rollers so that as the rollers turn about their horizontal axis in response to the timing and control system 17, the shear knives meet and shear the strip 12. From the crop shears 15a, the strips 12 are carried by a roll-out table 55 to the first finishing mill 27 (FIG. 1). A series of mills or rolling stations follow the first mill as generally indicated by block 57 in FIG. 2.

Referring more particularly to FIG. 1, from the crop shears 15a, the steel strips 12 enter a descaler 19 that includes pairs of upstream and downstream damming rolls 21 and 23, respectively. Between the pairs of damming rolls 21 and 23, each strip 12 is exposed to a high velocity liquid that impacts upon the surface area of the strip in order to remove an oxide layer before the strip enters a pair of work rolls 25 of the first finishing mill $F_1$. In order to direct the high velocity fluid (usually water) onto the surface of each strip 12, a plurality of spray heads 29a–d are positioned above and below the plane of travel of the strip in order to ensure that both the top and bottom surfaces of each strip are descaled.

The damming rolls 21 and 23 function to limit the upstream and downstream travel of the descaling fluid. In order to remove the fluid from the area between the pair of damming rolls 21 and 23, a hood (not shown) is typically provided for receiving the descaling fluid (and the oxide scales mixed therewith) after the fluid has impacted on the surface of the strips, stripped away the oxide layer and deflected away from the surfaces. Although the pairs of damming rolls 21 and 23 function adequately to prevent upstream and downstream spreading of the descaling fluid, they operate in a very poor environment of hot oxide scales and water, and therefore, require frequent maintenance and replacement. Because the damming rolls 21 and 23 deteriorate rapidly, any neglectful maintenance may result in the damming rolls 21 and 23 operating past their useful life and thereby causing improper processing of the strips such as scratches and rolled-in scales on the surface of the strips. In severe cases, the strip may even be stopped by the deteriorated damming rolls 21 and 23, requiring the mill to be stopped so the strip can be removed and scrapped.

From the descaler 19, the strips 12 are positioned by an entry guide 31 prior to entering between the pair of work rolls 25. The entry guide 31 supports each strip as it leaves the last pair of damming rolls 23 and also serves to guide the strip toward the center line of the finishing mill $F_1$. Often a cambered strip 12 will come out of the damming roll pair 23 and hit the entry guide 31. Sometimes the strip 12 may hesitate briefly, and then enter the mill with a cold band across the width of the strip caused by the cooling effect of the descaling fluid. These very serious deviations from the normal operating mode of the mill may result in breaking the work rolls 25 or, less seriously, a temporary shutdown of the mill while a cobbled strip 12 is removed.

In a conventional manner, top and bottom backup rolls 35 and 37 are mounted above and below, respectively, the pair of work rolls 25. Each of the backup rolls 35 and 37 and the work rolls 25 include longitudinal shafts (not shown) that are journaled into opposing sides of the frame 33 of the mill $F_1$. In order to cool the pair of work rolls 25, pairs of upper and lower spray headers 39a,b and 41a,b are mounted adjacent the top and bottom work rolls 25a and 25b, respectively. As a further aid in cooling the work rolls, a top entry wiper 43 is provided for scraping the surface of the top work roll 25a. As a complement to the entry wiper 43, an exit stripper 45 is mounted to the frame 33 and positioned to scrape the top work roll 25a on the exit side of the mill $F_1$. Similarly, the bottom work roll 25b is supplied with an exit stripper 47.

As indicated by the position of the entry guide 31 illustrated in phantom line, the design of the finishing mill $F_1$ must accommodate easy removal and replacement of the pair of work rolls 25. Such accommodation is an important design consideration since the work rolls 25 require frequent replacement, and a design allowing for efficient replacement of the rolls minimizes the down time of the mill. Therefore, the distance from the last pair of damming rolls 23 to the pair of work rolls 25 is determined by the amount of room needed to remove the entry guide 31 from its operating position proximate to the pair of work rolls so that the pair of work rolls can be easily removed from the mill housing 33 for replacement or maintenance.

Typically, the entire operation from exiting the crop shears 15a to entry between the pair of working rolls 25 covers a distance of approximately 25 to 40 feet and occurs in about 8 to 15 seconds (assuming a velocity of 120 to 180 feet per minute). It is generally accepted that the distance from the pair of finishing work rolls 25 to the crop shear 15a is determined by the design of the finishing mill entry guide 31, and the amount of room needed to remove the entry guide from its position adjacent the work rolls. In order to remove the entry guide 31, there must be adequate distance between the last set of damming rolls 23 and the pair of work rolls 25.

Figure 5:
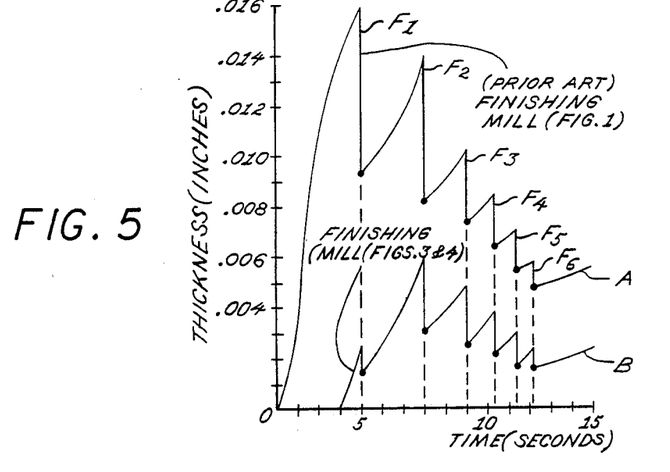
FIG. 5 is a graph illustrating the reduced oxide layer that may be expected to be found on strips finished by finishing mills according to the invention.

Referring briefly to FIG. 5, the thickness of the oxide layer formed on the surface of each strip 12 is a function of time and temperature wherein the initiation of the oxidation process begins after each strip has been descaled and continues until the strip has sufficiently cooled to a temperature that will not support further, rapid oxidation. As indicated by the exemplary plot A in FIG. 5 for the thickness of the oxidation layer in a strip 12 processed in a prior art finishing mill such as that shown in FIG. 1, a significant amount of the growth of the oxide layer occurs between the descaler 19 and the work rolls 25. Upon entry of each steel strip 12 to the first pair of work rolls 25, the thickness of the oxide layer is compressed as indicated by the first vertical line $F_1$ of plot A in FIG. 5. The following vertical lines in the exemplary prior art plot A represent further compression of the oxide layer in the mill stations ($F_2$, $F_3$ etc.) that follow the first pair of work rolls 25 in FIG. 1. Between each pair of work rolls, the oxide layer continues to thicken as indicated by the sloped portion of the plot A connecting the vertical line portions.

By reducing the time of exposure to ambient air after the strips 12 have left the descaler 19 and prior to their entry into the work rolls 25, a significant decrease in the thickness of the oxide layer in the finished strip will result. Referring to the second exemplary plot B in FIG. 5, by decreasing the time of exposure for the strips 12 between the descaler 19 and the work rolls 25, the thickness of the oxide layer when the strips enter the $F_1$ mill is much less than expected to be found in strips processed by the mill $F_1$ shown in FIG. 1. From this starting point of decreased oxidation, the same oxidation rates between the following finishing stations $F_2$, $F_3$ etc. will result in finished steel strips that have an oxide thickness that is considerably less than previously possible.

There are at least two mechanisms at work which promote a disproportionately high rate of oxidation during the time following the descaling of the strips 12. First, the temperature of the strips 12 is at its greatest prior to the introduction of the strips to the first station of the finishing mill. It is commonly recognized that iron oxide formation, like most other chemical reactions, is accelerated with increased temperature. Secondly, the time of exposure for the strips 12 as they travel from the descaler 19 to the $F_1$ mill is the longest exposure between any individual mill in the finishing mill, resulting in the relatively extreme build up of oxide thickness in front of the $F_1$ mill as illustrated by plot A in FIG. 5.

It has also been found that the iron oxide formed on the surface of the steel strips 12 form deposits of varying hardness. Specifically, deposits comprising FeO have a Vickers hardness between approximately 270 to 350, deposits of $Fe_3O_4$ have a hardness rating between approximately 450 to 500 and deposits of $Fe_2O_3$ have a hardness rating of approximately 1030. It is believed that when the time of exposure of the steel strips 12 is limited between the descaling process and the first pair of work rolls 25, a significant lesser amount of the harder iron oxide deposits are formed. It is readily seen that reduction in the amount of harder iron oxide deposits formed on the steel strips 12 may play a major roll in minimizing the maintenance required for the work rolls.

In accordance with one important aspect of the invention, the descaling spray is directed to the surfaces of the strips 12 such that fluid comprising the spray impacts onto the surfaces, strips the oxide layer from the surfaces and deflects upstream of the movement of the strip, carrying the oxide scales with it. By directing the descaling in a manner to ensure virtually all of the deflected fluid and scales are deflected upstream, a descaling apparatus 70 does not require damming downstream flow of fluid and scales. Therefore, any space requirements of the descaler 70 that are downstream of the spraying area are minimized. In accordance with another important aspect of the invention, an entry guide 53 (FIG. 3) is provided upstream of the descaler 70 so that the descaler immediately precedes the work rolls 25 such that the distance X in FIG. 2 may be minimized.

In keeping with the invention, a conventional hot metal detector 51 (FIG. 2) is located downstream of a pair of entry guide rollers 53 such that detection of the hot steel strips 12 by the hot metal detector provides detection signals to the timing and control system 17 that allow the system to synchronize changes in the position of the entry guide rollers with the movement of each strip. Similarly, a hot metal detector 59 provides location information to the crop shears 15a and the crop shear guides 15b. The entry guide rollers 53 preferably comprise a pair of rollers mounted for rotation about vertical axes, and each roller is mounted on an opposite side of the delay table 55 such that they form a channel that receives the strips 12 and functions to transversely position the strips prior to their entry into the work rolls 25 of the finishing mill $F_1$. Control of the movement of the entry guide rollers 53 and of the crop shear guides 15b will be discussed in greater detail in connection with FIGS. 4 and 6a,b, respectively.

Figure 3:
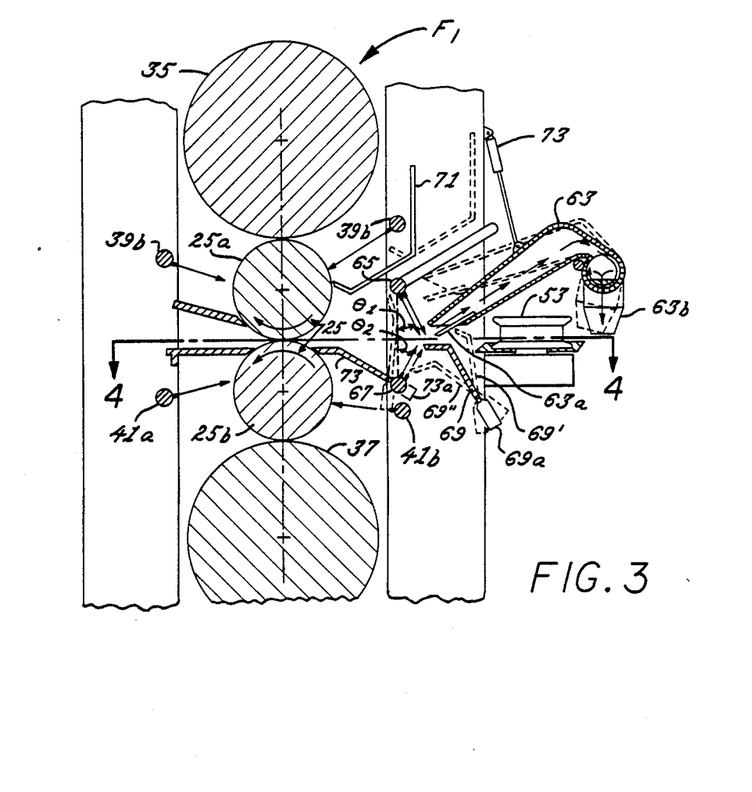
FIG. 3 is a side view of a schematic representation of an apparatus suitable for implementing a finishing mill according to the invention.

Referring to FIG. 3, a particular embodiment of the invention is illustrated for implementing the entry guide rollers 53 and descaler 70 of FIG. 2. Where elements in the finishing mill $F_1$ of FIG. 3 correspond to like elements in the finishing mill $F_1$ of FIG. 1, they have been numbered the same. Accordingly, these like-numbered elements will not be discussed again in connection with FIG. 3.

The descaler 70 includes a descaling hood 63 pivotally mounted over the top of the entry guide rollers 53 and having an opening downstream of the rollers for receiving descaling fluid deflected from the top surface of the strips 12. In order to aid the hood 63 in preventing the upstream movement of the deflecting fluid and scales, an elastomeric flap 63a is secured to the opening of the hood 63 and is positioned so that in its relaxed state it extends into the plane of the motion of the strips 12 such that when it is deflected by the oncoming head end of a strip it positively engages with the top of the strip in order to provide a seal between the strip and the hood.

Because the entry guide rollers 53 are mounted for rotation and transverse movement, they require protection from the high velocity fluid descaling headers 65 and 67 that function to descale the strips 12. In order to provide such protection, a bottom deflector 69 is mounted to the forward frame member 33 of the finishing mill $F_1$ such that in its relaxed position (indicated by the phantom line outline 69'), the uppermost portion of the deflector extends into the plane of the strips 12 so that the top of the deflector overlaps with the flap 63a of the hood 63 in a direction orthogonal to the plane of the strips. By providing such an overlap, the fluid from the descaling headers 65 and 67 is effectively deflected away from the entry guide rollers 53.

Movement of the deflector 69 from its position shown as 69' to its position shown in solid line is accomplished by the reaction of the deflector to the impact of the head end of each strip 12 onto the tip of the deflector extending into the plane of the strip's motion. The third position of the deflector 69 (indicated in phantom line as position 69") allows the deflector to be moved away from the operating area of the mill so that sufficient room can be created to easily remove a cobbled strip 12.

A top wiper 71 is mounted to the forward frame member 33 of the mill $F_1$ so as to be capable of movement between an operating position (shown in solid line) and a position for removing the pair of work rolls 25 shown in phantom. In order to guide the head end of each strip 12 to the area between the work rolls 25, a bottom guide 73 is provided. As with the top wiper 71, the bottom guide 73 may be moved to an out-of-the-way position as illustrated in phantom line so that the work rolls 25 can be easily removed.

As water is sprayed from the descaling headers 65 and 67 below and above the steel strips 12, respectively, it is deflected off the strips and collected by the descaling hood 63 or directed downwardly by the bottom deflector 69. From the descaling hood 63 the contaminated fluid is collected in a trough portion 63b of the hood and directed to a flume (not shown).

In normal operation, the hood 63 is positioned by a cylinder 74. Movement of the bottom deflector 69 between its position 69' and its position shown in solid line is provided by a counterweight portion 69a that causes the deflector to naturally assume its position 69'. When a strip 12 is present, the deflector 69 is biased against the lower surface of the strip. To move the deflector 69 into its position 69", conventional mechanical gearing may be used to move it and stabilize it into that position. Bottom guide 73 is also provided with a counterbalance 73a that eases the rotation of the guide about its pivot point. But, unlike the deflector 69, the guide 73 is fixed in its solid-line position unless rotated to its phantom-line position by suitable gearing (not shown).

Figure 4:
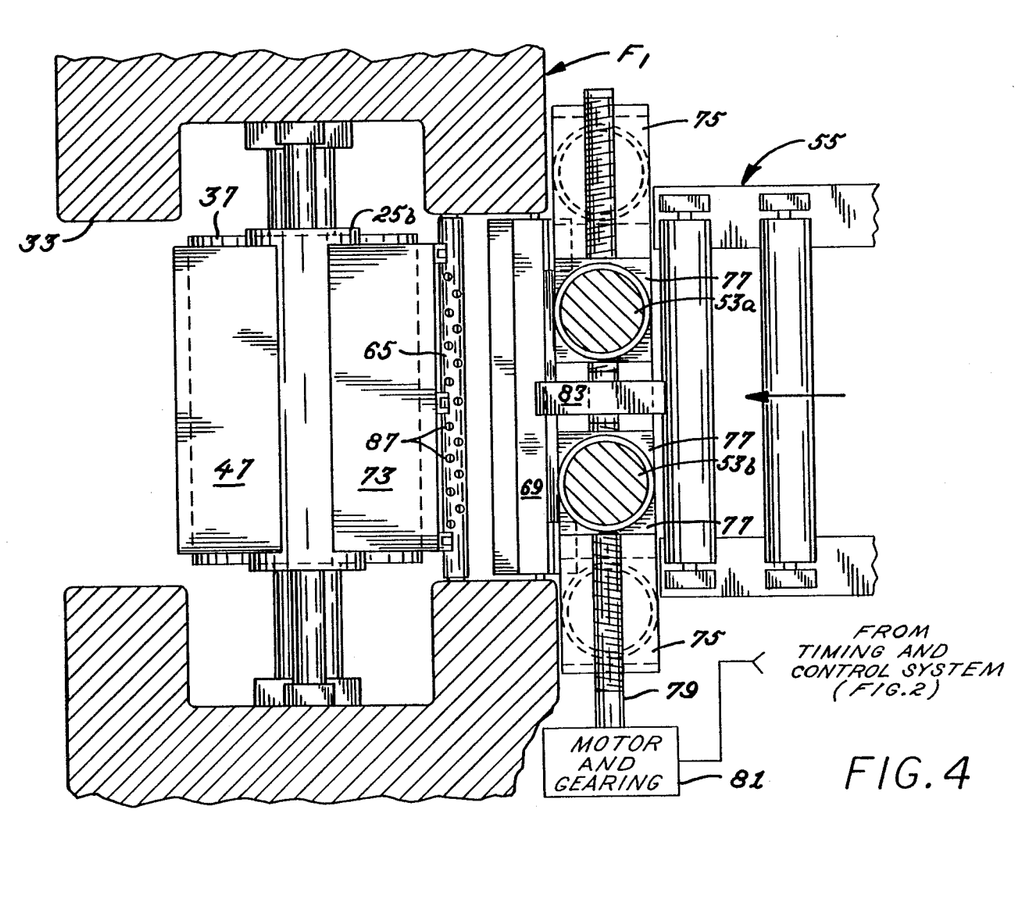
FIG. 4 is a plan view of the finishing mill of FIG. 3 taken along the line X—X in FIG. 3.

In keeping with the invention, the guide rolls 53a and 53b shown in FIG. 4, are mounted for rotation about a vertical axis on a platform 75. Each of the guide rolls 53a and 53b are mounted directly to a base section 77 that in turn is mounted to the platform 75. A threaded shaft 79 spans the length of the platform 75 and passes through bore sections (not shown) in the base sections 77. The threading of the shaft 79 is divided into two sections having reverse threading with respect to one another. Rotation of the shaft 79 by a motor and gearing unit 81 causes the base units 77 and the guide rollers 53a and 53b mounted thereon to move away or toward the center line of the finishing mill $F_1$. In order to support the head end of each strip 12 as it leaves the delay table 55 and enters the channel formed by the guide rollers 53a and 53b, a centering guide 83 is located along the center line of the mill $F_1$ and spans the width of the platform 75 so that the head ends of the strips 12 are supported as they leave the roll-out table and prepare to enter between the work rolls 25.

In response to detection of the head end of a strip 12 by hot metal detector 51 (shown FIG. 2), the timing and control system 17 supplies control signals to the motor and gearing 81 so that the guide rolls 53a,b are moved from their phantom-line positions to the solid line positions after the head end of the strip has passed downstream of the channel formed by the roll. By providing such movement of the rolls 53a,b in coordination with movement of the strips 12, the head end which is sometimes wider than the body of the strip may pass through a wide channel and the body of the strip may be centered by the narrower channel formed when the rolls are moved inwardly toward the central line of the mill $F_1$.

In keeping with the invention, it is very important that the angles $\theta_1$ and $\theta_2$ of the descaling spray with respect to the top and bottom surfaces, respectively, of the strips 12 be adjusted to minimize downstream flow. Normally, top and bottom spraying angles $\theta_1$, and $\theta_2$ of 10 to 15 degrees from perpendicular are used in the system of FIG. 1. Applicant believes the best angle for $\theta_1$, $\theta_2$ (FIG. 3) is 25 to 30 degrees. Increasing the angle of impact of the fluid requires the headers 65 and 67 to be moved closer to the strip 12 surfaces than previously necessary. The closer the headers 65,67 to the strips 12, the greater the angles $\theta_1$ and $\theta_2$ must be; thus, more certainly ensuring no fluid flows downstream. But placement of the headers 65,67 too close to the strips 12 may cause damage to the headers or sprays when a mill cobble occurs.

An angle of 25 to 30 degrees appears to be a good compromise between the incompatible goals of maximizing the descaling effectiveness, avoiding significant shortening of header life, and ensuring all fluid and scale deflects upstream. Preferably, the spray pattern of the descaling headers 65 and 67 is such that the cooling caused by the fluid spray is evenly distributed across the width of the strip 12. In FIG. 4, the nozzles 87 of the descaler header 65 are arranged in two offset rows such that the spray pattern from a nozzle is approximately equal to the distance separating adjacent nozzles in its row.

Figure 6A:
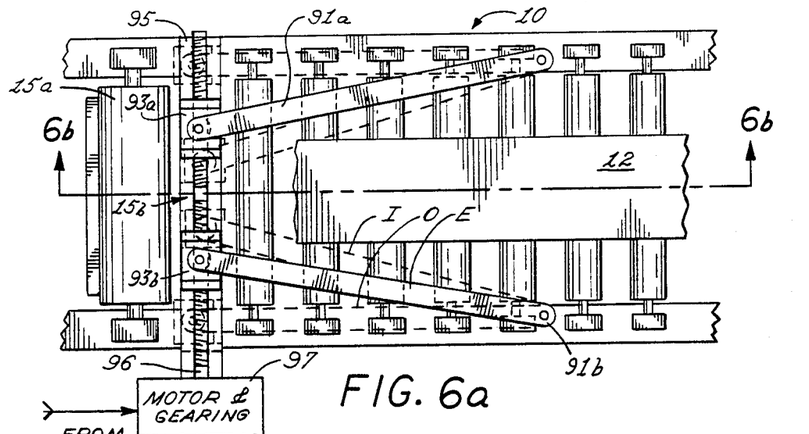
FIGS. 6a and 6b are top and side views, respectively, of a crop shear guide for centering the strips according to a preferred embodiment of the invention.
Figure 6B:
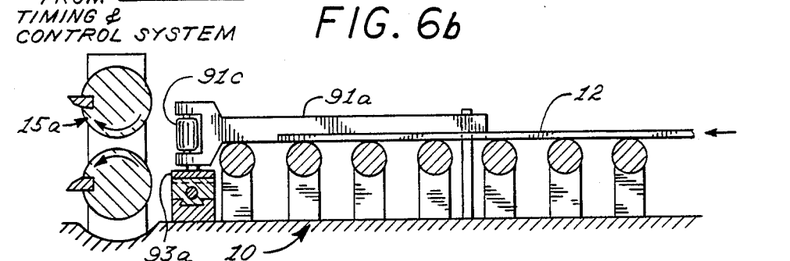

In order to aid the roller guides 53a,b in centering the strips 12, an improved crop shear guide is provided as illustrated in FIGS. 6a and 6b. Upstream of the crop shear rollers 15a are two opposing guide arms 91a and 91b that are each pivotally mounted to the delay table 10 at a first end. At the second end of each guide 91a or 91b, a roller 91c shown in FIG. 6b is mounted for vertical rotation and engagement with the sides of the strips 12. The second end of the guides 91a and 91b are mounted on base units 93a and 93b, and they include conventional lost-motion devices (not shown) which accommodate the arcuate movement of the second end of each guide as it rotates about its pivot point.

The crop shear guides 15b aid in centering the strips 12 as they travel downstream on delay table 55 in a manner that complements the guiding function of the roller guides 53a,b, thereby allowing the roller guides to be located upstream of the descaler 70 without sacrificing adequate centering of the strips before they enter the working rolls 25.

In keeping with the invention, the crop shear guides 91a and 91b are sequentially moved to three distinct positions in response to passage of the strips 12 past the hot metal detector 59 (FIG. 2) such that the strips are more closely centered on he delay tables 10 and 55 so that the entry guide rollers 53 may be successfully placed before the descaler 70 without compromising the overall centering of the apparatus immediately preceding the finishing mill.

Each of the base units 93a and 93b is mounted on a platform 95 spanning the width of the delay table 10, and the base units include a common threaded shaft 96 similar to that provided in connection with the roller guides 53. Also in a similar manner as the roller guides 53, a motor and gearing unit 97 rotates the shaft 96 in response to signals from the timing and control system 17 (FIG. 2) so as to move the second ends of the guides 91a,b between first, second and third positions in response to movement of the strips 12 detected by the hot metal detector 59 (FIG. 2).

Specifically, as the tail end of a previous strip 12 clears the channel formed by the crop shear guides 91a,b (15b in FIG. 2), the timing and control system 17 responds to the hot metal detector 59 by actuating the crop shears 15a so as to cut the tail end of the strip. This same signal may cause the motor and gearing 97 to open the channel formed by the guides 91a and 91b to an entry position shown in solid line as position "E" in FIG. 6a. As the head end of the next strip 12 passes under the hot metal detector 59, the timing and control system 17 causes the motor and gearing 97 to close the channel formed by the guides 91a,b as the head end enters the crop shears 15a. The guides 91a,b are moved to the phantom line position indicated as position "I". In this position, the channel formed by the guides 91a,b is as close to the width of the strip 12 as possible without pinching the strip between the rollers 91c. The signal delivered to the crop shears 15a for cutting the head end of the strip 12 also serves to generate signals from the timing and control system 17 that cause the motor and gearing 97 to move the crop shear guides 15b to a third position shown in phantom line in FIG. 6a and indicated as position "O".

The centering action of the guides 15b in position "I" places the head end of the strip 12 in the center of the delay tables 10 and 55, and movement of the guides 15b to form a wider channel in position "O" eliminates any force being put on a cambered strip 12. Therefore, the strip 12 will be cropped by the crop shears 15a and proceed to the first finishing mill 27 in the exact center of the $F_1$ mill entry guides 53. After the strip 12 enters the work rolls 25, an electrical load signal can detect the presence of the strip and serve to activate the crop shear guides 91a,b to return them to the position "I" in FIG. 6a. In this position, if the strip 12 is off center, the guides 91a,b will force the strip 12 to center and maintain the strip in a central position during the entire rolling process.

Referring more specifically to FIG. 6a, the guides 91a, 91b are in position "E" as the head end of a strip 12 approaches. The "E" position generally centers the strip 12, but it allows enough of a channel width to allow the head of the strip to proceed without stopping. After the head end of the strip 12 is detected by the hot metal detector 59, the guides 91a, 91b are moved from the "E" position to their "I" position in order to center the head end exactly on the center line of the F₁ mill entry guides 53. The guides 91a, 91b stay in the "I" position only momentarily (e.g., 0.2 seconds) and are thereafter quickly moved to the "O" position. In the "O" position the guides 91a, 91b will not cause the strip 12 to move off center if the strip is cambered. Once a load signal from the F₁ mill indicates the strip 12 has entered the mill, the guides 91a, 91b are returned to the "I" position in order to keep the strip 12 centered for the remainder of the rolling by the finishing mill.

From the foregoing, it will be appreciated that an improved method for guiding and cleaning steel strips formed in a hot strip mill is provided which can be installed in existing arrangements by replacing the standard damming rolls 38 and installing the new system of a descaling hood 63 and bottom deflector 69 closer to the work rolls 25, and also providing for particular angular contact of the descaling fluid to the steel strip 12. Any well-known system may be used for controlling longitudinal movement of the entry guide rolls 53 or the pivotal movement of the descaling hood 63 such as electromechanical, pneumatic or hydraulic systems.

I claim:

1. In a hot strip mill, a system for descaling an oxide layer on strips as they are delivered to a finishing mill, said system comprising:
   means for supporting said strips as they leave a previous mill and move toward said finishing mill;
   guide means associated with said supporting means for centering said strips as they enter said finishing mill;
   a pair of cooperating work rolls comprising said finishing mill for receiving said strips from said supporting means;
   said guide means being located upstream relative to the direction of motion of said strips from said pair of cooperating work rolls such that a predetermined distance separates said pair of cooperating work rolls from the closest portion of said guide means; and
   a descaling means for removing an oxide layer from said strips prior to their engaging said pair of cooperating work rolls, said descaling means positioned within said predetermined distance so as to be immediately adjacent an upstream side of said pair of cooperating work rolls and downstream of said guide means, such that said strips experience a minimum buildup of a new oxide layer after descaling by said descaling means and before entry into said finishing mill, resulting in the minimization of the thickness of the oxide layer formed on the strips after they are processed by said finishing mill.

2. A system as set forth in claim 1 wherein said descaling means comprises at least one spray head for directing high velocity fluid to impact on the surfaces of said strips such that said fluid and any scales dislodged by said impacting are deflected upstream from said point of impact.

3. A system as set forth in claim 1 wherein said guide means includes a crop shear guide mounted on said supporting means upstream of a crop shear, said crop shear guide forming a channel of varying width on said supporting means for receiving said strips, said channel changing its width in response to signals from a control means such that for each strip the channel sequentially changes from a first width, to a second narrower width and to a third width that is wider than said first width.

4. A system as set forth in claim 3 wherein said guide means includes a pair of roller guides mounted to said supporting means downstream of said crop shear for forming a channel of varying width for receiving said strips wherein said pair of roller guides change the width of said channel in response to signals from said control means;
   said control means issuing commands to said pair of roller guides to change the width of said channel in response to the changing position of each of said strips as it enters said finishing mill.

5. A system as set forth in claim 4 wherein each of the roller guides in said pair of roller guides is mounted on said supporting means for rotation about a vertical axis.

6. A system as set forth in claim 4 wherein said descaling means includes a means for collecting said fluid as it rebounds off the surfaces of said strips after impact, thereby diverting scales carried by said rebounding fluid so that said scales are not redeposited on said strips upstream of the area of fluid impact.

7. A system as set forth in claim 6 wherein said collecting means includes a deflecting guide mounted to said finishing mill for rotation about an axis transverse to the direction of strip movement, said deflecting guide being responsive to the absence of a strip along the area of said path immediately above said deflecting guide so as to rotate into a position that intersects said path, thereby effectively protecting said pair of roller guides from the high velocity fluid exiting said descaling means.

8. In a hot strip mill operation, an apparatus for minimizing the oxide layer formed on the surfaces of elongated steel strips, said apparatus comprising:
   a pair of work rolls forming a nip that receives said elongated steel strips;
   descaling means located immediately adjacent an upstream side of said pair of work rolls for delivering descaling fluid to said elongated steel strips such that substantially all of said descaling fluid and oxide scales mixed therein are deflected upstream from the area said descaling fluid impacts said elongated strips; and
   first means for centering the head ends of said elongated steel strips on a delay table which directs said elongated steel strips into said nip between said work rolls, said first means exclusively located upstream of said descaling means, thereby enabling said descaling means to be located immediately adjacent the upstream side of said pair of work rolls.

9. An apparatus as set forth in claim 8 including a crop shear and a crop shear guide upstream of said crop shear and part of said first means for centering the head ends of said elongated steel strips on a delay table which directs said strips downstream into said crop shear and said nip between said work rolls, said crop shear guide including second means for allowing cambered areas of the strips following the head ends to move away from a centered position on said delay table and thereby maintain said head end in its centered position as it enters said nip.

10. An apparatus as set forth in claim 8 wherein said descaling means includes means for delivering said descaling fluid to said elongated steel strips at an angle greater than 15° from the surface of said elongated steel strips in order to ensure that substantially all of said descaling fluid and oxide scales mixed therein are deflected upstream.

11. An apparatus as set forth in claim 9 wherein said second means includes two opposing guide arms forming a channel and control means for moving said opposing guide arms into a plurality of different positions in response to the movement of said elongated steel strips on said delay table, thereby varying the width of said channel.

12. An apparatus as set forth in claim 11 wherein said control means includes means for sensing the positions of at least the head ends of said elongated steel strips on said delay table in order to cause said two opposing guide arms to (1) form a channel that closely guides the head end of each of said elongated steel strips into said crop shear and thereafter (2) form a wider channel that accommodates cambered areas of each elongated steel strip.

13. An apparatus as set forth in claim 9 wherein said first means also includes entry guide rollers positioned immediately upstream of said descaling means for positioning the head ends of said elongated steel strips for their proper entry into said nip of said pair of work rolls.

14. An apparatus as set forth in claim 13 wherein said first means includes means for protecting said entry guide rollers from said descaling fluid.

15. An apparatus as set forth in claim 8 wherein said apparatus is part of a first station in a finishing mill such that said elongated steel strips experience a minimum buildup of a new oxide layer after descaling by said descaling means and before entry into said finishing mill, resulting in the minimization of the thickness of the oxide layer formed on said elongated steel strips after they are processed by said finishing mill.

16. An apparatus as set forth in claim 8 including means for directing deflected descaling fluid and oxide scale away from the surface of said elongated steel strips.

17. An apparatus for minimizing the oxide layer formed on the surfaces of elongated steel strips during the processing of said strips in a hot strip mill, said apparatus comprising in combination:
a pair of work rolls forming a nip that receives said elongated steel strips;
descaling means located immediately adjacent an upstream side of said pair of work rolls relative to the direction of motion of said elongated steel strips for delivering descaling fluid to said elongated steel strips such that substantially all of said descaling fluid and oxide scales mixed therein are deflected upstream from the area said descaling fluid impacts said elongated strips;
first means for centering the head ends of said elongated steel strips on a delay table which directs said elongated steel strips into said nip between said work rolls, said first means exclusively located upstream of said descaling means, thereby enabling said descaling means to be located immediately adjacent the upstream side of said pair of work rolls; and
said first means including means for allowing cambered areas of said elongated steel strips following said head ends to move away from a centered position on said delay table and thereby maintain said head ends in their centered positions as they enter said nip.

18. An apparatus as set forth in claim 17 wherein said descaling means comprises at least one spray head for directing high velocity fluid to impact on the surfaces of said strips such that said fluid and any scales dislodged by said impacting are deflected upstream from said point of impact.

19. An apparatus as set forth in claim 17 wherein said first means includes a crop shear guide located upstream of a crop shear, said crop shear guide forming a first channel of varying width on said delay table for receiving said strips, said first channel changing its width in response to signals from a control means such that for each strip the width of said first channel sequentially changes from first, second and third widths, where said first width is greater than said second width and said third width is greater than both said first and second widths in order that any cambered areas of said elongated steel strips are guided by said first channel of said third width.

20. An apparatus as set forth in claim 19 wherein said first means includes a pair of roller guides mounted to said delay table downstream of said crop shear for forming a second channel of varying width for receiving said strips wherein said pair of roller guides change the width of said second channel in response to signals from said control means; and
said control means issuing said signals to vary the widths of said first and second channels formed by said crop shear guide and said pair of roller guides, respectively, in response to the changing position of the head end of each strip as it travels down said delay table and toward said nip of said pair of work rolls.

21. An apparatus as set forth in claim 13 wherein each of the roller guides in said pair of roller guides is mounted on said delay table for rotation about a vertical axis.

22. An apparatus as set forth in claim 17 wherein said apparatus is part of a first station in a finishing mill such that said elongated steel strips experience a minimum buildup of a new oxide layer after descaling by said descaling means and before entry into said nip of said pair of work rolls, resulting in the minimization of the thickness of the oxide layer formed on said elongated steel strips after they are processed by said finishing mill.

23. An apparatus as set forth in claim 17 wherein said descaling means includes means for delivering said descaling fluid to said elongated steel strips at an angle greater than 15° from a reference plane normal to the surface of said elongated steel strips in order to ensure that substantially all of said descaling fluid and oxide scales mixed therein are deflected upstream.

24. An apparatus as set forth in claim 17 wherein said first means includes a crop shear guide located upstream of a crop shear for centering said head ends of said elongated steel strips on said delay table which directs said strips downstream into said crop shear and said nip between said work rolls.

25. An apparatus as set forth in claim 17 including a control means for sensing the positions of at least the head ends of said elongated steel strips on said delay table in order to cause said first means to (1) form a channel that closely guides the head end of each of said elongated steel strips into said crop shear and thereafter (2) form a wider channel that accommodates cambered areas of each elongated steel strip.

26. An apparatus as set forth in claim 20 wherein said first means includes means for protecting said pair of roller guides from said descaling fluid.

27. An apparatus as set forth in claim 26 wherein said protecting means includes a deflecting guide mounted for rotation about an axis transverse to the direction of strip movement on said delay table, said deflecting guide being responsive to the absence of a strip in an area immediately above said deflecting guide so as to rotate into a position that intersects the path of said strips in an area between said descaling means and said pair of roller guides, thereby effectively protecting said pair of roller guides from said descaling fluid.

* * * * *